US010340544B2

(12) United States Patent
Schmitz et al.

(10) Patent No.: US 10,340,544 B2
(45) Date of Patent: Jul. 2, 2019

(54) ION-EXCHANGE MEMBRANE MADE OF A BIAXIALLY STRETCHED β-POROUS FILM

(71) Applicant: Treofan Germany GmbH & Co. KG, Neunkirchen (DE)

(72) Inventors: Bertram Schmitz, Saarbrücken (DE); Detlef Busch, Saarlouis (DE); Melanie Wisniewski, Homburg (DE)

(73) Assignee: Treofan Germany GmbH & Co. KG (DE)

( * ) Notice: Subject to any disclaimer, the term of this patent is extended or adjusted under 35 U.S.C. 154(b) by 255 days.

(21) Appl. No.: 15/105,286

(22) PCT Filed: Dec. 16, 2014

(86) PCT No.: PCT/EP2014/003383
§ 371 (c)(1),
(2) Date: Jun. 16, 2016

(87) PCT Pub. No.: WO2015/090571
PCT Pub. Date: Jun. 25, 2015

(65) Prior Publication Data
US 2016/0322662 A1    Nov. 3, 2016

(30) Foreign Application Priority Data

Dec. 19, 2013 (DE) ........................ 10 2013 021 292

(51) Int. Cl.
| *H01M 8/10* | (2016.01) |
| *B29C 48/00* | (2019.01) |
| *C08J 5/22* | (2006.01) |
| *H01M 8/1069* | (2016.01) |
| *H01M 8/1039* | (2016.01) |
| *H01M 2/16* | (2006.01) |
| *H01M 8/1011* | (2016.01) |
| *H01M 8/1023* | (2016.01) |
| *H01M 8/1053* | (2016.01) |
| *H01M 8/106* | (2016.01) |
| *H01M 8/1067* | (2016.01) |
| *H01M 8/1081* | (2016.01) |
| *H01M 8/18* | (2006.01) |
| *B29C 55/14* | (2006.01) |
| *H01M 8/1086* | (2016.01) |
| *H01M 8/20* | (2006.01) |
| *H01M 8/1025* | (2016.01) |
| *H01M 8/103* | (2016.01) |
| *H01M 8/1018* | (2016.01) |
| *B29K 23/00* | (2006.01) |
| *B29L 31/34* | (2006.01) |
| *B29L 31/00* | (2006.01) |

(52) U.S. Cl.
CPC ....... *H01M 8/1083* (2013.01); *B29C 48/0018* (2019.02); *B29C 55/14* (2013.01); *C08J 5/22* (2013.01); *C08J 5/2231* (2013.01); *H01M 2/1653* (2013.01); *H01M 2/1686* (2013.01); *H01M 8/106* (2013.01); *H01M 8/1011* (2013.01); *H01M 8/1023* (2013.01); *H01M 8/1039* (2013.01); *H01M 8/1053* (2013.01); *H01M 8/1067* (2013.01); *H01M 8/1081* (2013.01); *H01M 8/1086* (2013.01); *H01M 8/188* (2013.01); *H01M 8/20* (2013.01); *B29K 2023/12* (2013.01); *B29L 2031/3468* (2013.01); *B29L 2031/755* (2013.01); *C08J 2323/10* (2013.01); *C08J 2323/12* (2013.01); *H01M 8/103* (2013.01); *H01M 8/1025* (2013.01); *H01M 2008/1095* (2013.01); *H01M 2300/008* (2013.01); *H01M 2300/0082* (2013.01); *Y02E 60/523* (2013.01); *Y02E 60/528* (2013.01); *Y02P 70/56* (2015.11)

(58) Field of Classification Search
None
See application file for complete search history.

(56) References Cited

U.S. PATENT DOCUMENTS

| 6,632,847 | B1 | 10/2003 | Soczka-Guth et al. |
| 6,914,084 | B1 | 7/2005 | Soczka-Guth et al. |
| 9,174,914 | B2 | 11/2015 | Busch et al. |
| 2002/0187401 | A1* | 12/2002 | Lee ................... B01D 67/0027 429/303 |
| 2003/0069386 | A1 | 4/2003 | Clauss et al. |
| 2006/0234097 | A1 | 10/2006 | Boehm et al. |
| 2011/0159346 | A1* | 6/2011 | Yamamoto ............. B32B 27/08 429/144 |

(Continued)

FOREIGN PATENT DOCUMENTS

| DE | 3610644 A1 | 10/1986 |
| DE | 4420989 A1 | 12/1995 |
| DE | 10312029 A1 | 10/2004 |
| DE | 102013001700 | 2/2013 |
| EP | 0557721 A2 | 9/1993 |
| EP | 1 124 625 A1 | 8/2001 |
| EP | 1 144 100 A2 | 10/2001 |
| EP | 2337114 A1 | 6/2011 |
| EP | 2381522 A1 | 10/2011 |
| EP | 2903830 A1 | 8/2015 |
| JP | H0575835 B2 | 10/1993 |
| JP | H0768377 B2 | 7/1995 |

(Continued)

OTHER PUBLICATIONS

International Preliminary Report on Patentability from corresponding foreign application PCT/EP2014/003383 dated Jun. 21, 2016.

(Continued)

Primary Examiner — Scott J. Chmielecki
(74) Attorney, Agent, or Firm — Drinker Biddle & Reath LLP

(57) ABSTRACT

The invention describes an ion exchange membrane formed from a biaxially orientated single or multiple-layered β-porous polypropylene film which comprises at least one β-nucleating agent and an ion-conducting polymer and has a Gurley value of at least 10000 s.

13 Claims, No Drawings

(56) References Cited

U.S. PATENT DOCUMENTS

2015/0263322 A1* 9/2015 Schmitz .............. B29C 47/0021
                                                           429/145

FOREIGN PATENT DOCUMENTS

| JP | 2013076072 A | 4/2013 |
|----|---|---|
| WO | WO-96/29359 A1 | 9/1996 |
| WO | WO-96/29360 A1 | 9/1996 |
| WO | WO-0023177 A1 | 4/2000 |
| WO | WO-0027513 A2 | 5/2000 |
| WO | WO-2011/047797 A1 | 4/2011 |
| WO | WO-2014056591 A1 | 4/2014 |

OTHER PUBLICATIONS

International Search Report with Written Opinion of International Searching Authority (in German) for PCT/EP2014/003383 dated Mar. 27, 2015.

* cited by examiner

ION-EXCHANGE MEMBRANE MADE OF A BIAXIALLY STRETCHED β-POROUS FILM

CROSS-REFERENCE TO RELATED APPLICATIONS

This application is a national stage application (under 35 U.S.C. § 371) of PCT/EP2014/003383, filed Dec. 16, 2014, which claims benefit of German Application No. 10 2013 021 292.8, filed Dec. 19, 2013, both of which are incorporated herein by reference in their entirety.

In the prior art, porous films are known which are used as membranes or separators in batteries or accumulators. These polyolefin films with high porosities can be produced using various known methods: the filler method; cold stretching, the extraction method and the β-crystallite method. These methods are primarily distinguished by the various mechanisms by means of which the pores are produced.

In the filler method, the pores are produced upon stretching due to the incompatibility of the filler with the polymer matrix. The large quantities of filler of up to 40% by weight have the effect of compromising the mechanical strength of these porous films despite the stretching. Furthermore, the pore size distribution is very wide.

In the extraction method, the pores are produced by dissolving out a component from the polymer matrix using a suitable solvent. Here, many variations have been developed which are distinguished by the type of additive and the suitable solvent. Both organic and inorganic additives may be extracted. This extraction may be carried out as the final step of the method for the manufacture of the film, or it may be combined with a subsequent stretching step.

A reliable but cost-intensive method is based on stretching the polymer matrix at very low temperatures (cold stretching). The film is initially extruded in the usual manner and then tempered for several hours in order to increase the proportion of crystals. In the next step of the method, cold stretching is carried out in the longitudinal direction at very low temperatures in order to produce a plurality of defects in the form of very small micro-cracks. This pre-stretched film with defects is then stretched at higher temperatures with higher factors, once again in the same direction, whereupon the defects are enlarged to form pores which form a network-like structure. These films combine high porosities and good mechanical strengths in the direction that they have been stretched, generally in the longitudinal direction. The mechanical strength in the transverse direction, however, remains insufficient, whereupon the resistance to perforation is poor and the tendency to split in the longitudinal direction arises.

A further known method for the manufacture of porous films is based on admixing β-nucleating agents to polypropylene. Upon cooling the melt, the β-nucleating agent causes the polypropylene to form high concentrations of what are known as β-m crystallites. When subsequently stretched in the longitudinal direction, the β-crystallites are transformed into the alpha crystalline form of the polypropylene. Since these various crystal forms have different densities, here again, initially many microscopic defects are formed which are torn by stretching to form pores. The films manufactured using this method have high porosities and good mechanical strengths in the longitudinal and transverse direction and are highly efficient economically. These films will hereinafter be termed β-porous films.

In addition to the porous separator films, there are also membranes formed from ion-conductive polymers (ionomers), which are used in contemporary energy storage means such as fuel cells, redox flow batteries or lithium-sulphur batteries. In these applications, gas-tight separator films with ion conductivity are an essential component without which efficiency and safe operation of the cells would not be possible.

Fuel cells obtain electrical energy directly from the controlled chemical reaction of a fuel by its electrochemical oxidation. Low temperature fuel cells are considered to be particularly clean and environmentally-friendly sources of electrical energy which are used as alternative current sources for motor vehicles and in electronic devices such as mobile phones and the like, since they can be operated at lower temperatures than other fuel cells.

In contrast to batteries, the fuel cell is an open system with a continuous fuel supply. Examples of the fuels are hydrogen or methanol. Oxidation of the hydrogen or another fuel takes place at the anode. The electrons which are released thereby travel through the electrode material (gas diffusion electrode) into the electrical conductor. The electrons reach the cathode via the conductor and the external load, whereupon they reduce the oxygen which has been supplied to the cathode. Between the electrodes is an electrolyte as the proton conductor, through which the protons reach the cathode from the anode. At the cathode, the protons react with the oxygen and the electrons to form water. This membrane-electrode arrangement (MEA) is the core part of the polymer electrolyte fuel cell (PEFC).

A polymer electrolyte fuel cell of this type comprises at least one membrane electrode unit with gas diffraction electrodes on both sides of a proton exchange membrane.

The proton exchange membrane is based on a polymer electrolyte membrane (PEM) formed from a polymer framework which comprises acid groups such as sulphonic acid and/or carboxylic acid groups. This PEM allows the protons to pass through selectively and travel to the cathode. An example of proton exchange membranes of this type are membranes formed from Nafion®.

The proton exchange membrane simultaneously forms a barrier for the fuels, i.e. it must have a low gas permeability with respect to hydrogen or methanol. If the proton exchange membrane has a gas permeability which is too high, then hydrogen can escape from the anode side to the cathode side, and oxygen can escape from the cathode side to the anode side, resulting in what is known as a chemical short-circuit.

This means that a satisfactory voltage is not obtained and hydrogen peroxide is formed by the direct reaction between hydrogen from the anode side and oxygen from the cathode side, which deteriorates the properties of the proton exchange membrane.

In order to reduce the internal resistance of the cells and thus to increase the power of the fuel cell, the proton exchange membrane should be as thin as possible. This reduction in thickness, however, is often accompanied by a higher gas permeability as regards the fuels.

The thinner the material, the lower is the mechanical strength of the membrane, making them more difficult to handle during the manufacture of the membrane electrode units.

Polymer electrolyte membranes which are known in the art consist of proton-conducting polymer materials. For the sake of brevity, these materials will hereinafter also be known as ionomers. Membranes are known which are formed from tetrafluoroethylene-fluorovinylether copolymers with acid functions, in particular sulphonic acid groups. An example of this type of material is marketed under the trade name Nafion® by E.I. du Pont. However, other, in particular fluorine-free ionomer materials are known, such as sulphonated polyetherketones or aryl ketones or polybenzimidazoles for the manufacture of polymer electrolyte membranes.

Similarly, in the direct methanol fuel cell (DMFC), methanol is oxidized with water at the anode to form $CO_2$. Here again, protons are released which then have to travel through the membrane to the cathode with as little loss as possible, where they react with the oxygen to form water. If the methanol diffuses or flows directly from the anode side through the separator to the cathode, it reacts directly with the oxygen on the cathode side, which results in a loss of efficiency as a consequence of the direct "combustion" of unused methanol on the cathode side. This undesirable effect is also termed "methanol crossover". Here again, the separator should keep the methanol on the anode side and simultaneously have good proton conductivity.

In the redox flow battery, the separator must separate two half-cells through which an electrolyte flows. The electrolytes here consist of salts dissolved in a solvent, wherein the cations in the half-cells form redox pairs with various oxidation states. Either inorganic or organic acids are used as the solvent. Redox pairs which may be used are compounds formed, for example, from titanium, iron, chromium, vanadium, cerium, zinc or bromine. Upon discharging, the metal ion in half cell 1 with the higher oxidation number is reduced to the metal ion with the lower oxidation number, and in half cell 2, the metal ion with the lower oxidation state is oxidized to a higher oxidation state. Here again, the electric charge carrier which balances the charge in the cell is the proton. Here again, direct mixing of the two electrodes as a result of unwanted transport through the separator would result in a loss of efficiency as a consequence of direct exchange of charge between the two metal ions. Good proton conductivity is necessary, however, in order to allow the cell to operate efficiently.

In lithium-sulphur accumulators, which are still a relatively recent development, during discharge at the anode, metallic lithium is oxidized to the lithium cation, travels through the separator to the cathode, where it then reacts with the sulphur to form lithium sulphide. During the charging procedure, the compound which is formed is dissolved once again and lithium is deposited at the anode. Since a portion of the sulphur on the cathode side is present in the electrolyte in its allotropic forms, in this application as well, the electrolytes in the two half cells have to be prevented from coming into direct contact. This would cause the metallic lithium to react directly with the sulphur, reducing the efficiency and eventually making it impossible to recharge it. The lithium ion as the cation, however, should be able to migrate with as little resistance as possible through the separator so that here again, a high cation conductivity is desirable for the separator.

Proton exchange membranes produced from a porous film by filling with an ion exchange resin are known, for example from JP-B-5-75835, JP-B-7-68377 or JP-A-2001.

The proton exchange membranes which are known from these documents, however, still have room for improvement as regards their power and properties; particularly when operating the fuel cell at high temperatures and low humidities, the performance of the cells is poor.

Definitions

"β-porous films" within the context of the present invention are films which are primarily constructed from propylene polymers and contain at least one β-nucleating agent, and in which their porosity has been produced by transforming β-crystallites of the polypropylene into alpha crystallites during the manufacture of the film.

"ion-conducting polymers" within the context of the invention are polymers which contain ionic (cationic or anionic) side groups and which are ion-conducting via the counter-ion of these groups. Ion-conducting polymers are also known as ionomers or polymer electrolytes.

"Ion exchange membranes" within the context of the present invention are membranes which are constructed from ion-conducting polymers or which contain these ion-conducting polymers as a filling or coating. Ion exchange membranes are also known as polymer electrolyte membranes (PEM).

Basically, a good ion exchange membrane should have the following properties:
  excellent power, in particular when operating a fuel cell at high temperature and low humidity,
  good mechanical strength, in order to be able to act as a mechanical stabilizer,
  good dimensional stability,
  high proton conductivity,
  good thermal stability, for example low shrinkage at high temperatures,
  good mechanical stability, for example a high E modulus and a good resistance to perforation,
  it should be chemically inert, i.e. the ion exchange membrane should also have excellent durability, even in a chemically aggressive environment, and
  it should have good separator properties, i.e. low permeabilities for $H_2$ and $O_2$ in the case of a PEFC and for methanol in the case of a DMFC,
  it should have a suitable surface area, which means that good contact can be obtained with the electrodes as well as a good adhesion therewith,
  it should be capable of being operated under fuel cell conditions with sufficient wetting, and/or
  it should have a service life of approximately 8000 hours without degradation, as required for mobile applications.

Thus, the demands upon an ion exchange membrane of this type are many and extremely varied.

The aim of the present invention is to provide an ion exchange membrane with advantageous properties, in particular with a low permeability to gases and good dimensional stability.

In the context of the present invention, it has been discovered that β-porous films can be coated or filled very well with ion-conducting polymers, preferably with acid-modified fluoropolymers, and advantageously can be used as ion exchange membranes. The ion exchange membranes in accordance with the invention have a high power, even at high temperatures and at low humidities, good dimensional stability and an excellent durability, i.e. the ion exchange membrane is chemically inert as regards various operational stresses. After filling or coating with ion-conducting polymers, the permeability to hydrogen, oxygen and methanol, and also to metal ions, is surprisingly low.

The β-porous film which is used for the manufacture of the ion exchange membrane comprises at least one porous layer which is constructed from propylene homopolymers and/or propylene block copolymers as the main component and contains β-nucleating agents. Optionally, other polyolefins may additionally be contained therein in small quantities, as long as they do not have a deleterious effect on the porosity and other essential properties. Furthermore, the porous layer may optionally contain additional and normal additives, for example stabilizers or neutralizing agents, in respectively effective quantities.

The porosity of the β-porous film in this regard is produced by the transformation of β-crystalline polypropylene when the film is stretched, wherein at least one β-nucleating agent is contained in the film.

Suitable propylene homopolymers contain 98% to 100% by weight, preferably 99% to 100% by weight of propylene units and have a melting point (DSC) of 150° C. or higher, preferably 155° C. to 170° C., and in general a melt flow index of 0.5 to 10 g/10 min, preferably 2 to 8 g/10 min at 230° C., and at a force of 2.16 kg (DIN 53735). Isotactic propylene homopolymers with a proportion which is soluble in n-heptane of less than 15% by weight, preferably 1% to 10% by weight, constitute preferred propylene homopolymers for the porous layer. Advantageously, isotactic propylene homopolymers with a high chain isotacticity of at least 96%, preferably 97-99% ($^{13}C$-NMR; triad method) may be used. These raw materials are known as HPP (highly isotactic polypropylene) or HCPP (highly crystalline polypropylene) polymers in the prior art and are characterized by a high stereoregularity of the polymer chains, higher crystallinity and a higher melting point (compared with propylene polymers with a $^{13}C$-NMR isotacticity of 90% to <96% which may also be used).

Propylene block copolymers have a melting point of more than 140° C. to 175° C., preferably 150° C. to 170° C., in particular 150° C. to 165° C. The co-monomer content, preferably that of ethylene, is, for example, between 1% and 20% by weight, preferably between 1% and 10% by weight. The melt flow index of the propylene block copolymers is generally in the range 1 to 20 g/10 min, preferably in the range 1 to 10 g/10 min.

The porous layer may additionally and if necessary contain other polyolefins, as long as they do not have a negative influence on the properties, in particular the porosity and the mechanical strengths and the permeability. Examples of other polyolefins are random copolymers of ethylene and propylene with an ethylene content of 20% by weight or less, statistical copolymers of propylene with $C_4$-$C_8$ olefins with an olefin content of 20% by weight or less, terpolymers of propylene, ethylene and butylene with an ethylene content of 10% by weight or less and with a butylene content of 15% by weight or less, or other polyethylenes such as LDPE, VLDPE, and LLDPE.

In general, any known additive may be suitable as the β-nucleating agent for the porous layer which promotes the formation of β-crystals of the polypropylene upon cooling of a polypropylene melt. β-nucleating agents of this type, and also their mode of action in a polypropylene matrix, are known in the art per se and will be described in more detail below.

Various crystalline phases of polypropylene are known. When a melt is cooled, α-crystalline polypropylene is usually and overwhelmingly formed; it has a melting point of approximately 158-165° C. By employing a specific temperature profile, a small proportion of β-crystalline phase may be produced on cooling which, compared with the monoclinic α-crystalline form, has a substantially lower melting point, namely 144-150° C. Additives are known in the prior art which result in an increased proportion of the β-crystalline form upon cooling of the polypropylene, for example γ-quinacridones, dihydroquinacridines or calcium salts of phthalic acid.

For the purposes of the present invention, preferably, highly active β-nucleating agents are used which have a β-activity of 40% to 100%, preferably 50% to 95% (DSC, $2^{nd}$ heating curve). The β-activity is the maximum achievable proportion of β-crystalline polypropylene and is determined from the $2^{nd}$ heating curve of the DSC. Preferably, for example, a two-component β-nucleation system formed from calcium carbonate and organic dicarboxylic acids as described in DE 3 610 644 is used; reference thereto is specifically made herein. Particularly advantageously, calcium salts of dicarboxylic acids, such as calcium pimelate or calcium suberate as described in DE 4 420 989, are used; again, reference thereto is specifically made herein. In addition, the dicarboxamides described in EP-A-0 557 721, in particular N,N-dicyclohexyl-2,6-naphthalene dicarboxamide, are suitable β-nucleating agents. Furthermore, nano-dicarboxylic acid salts, for example pimelates or suberates with a particle size of <500 nm, preferably <100 nm, as described in WO 2011/047797 A1, are particularly suitable. These nano-dicarboxylic acid salts are produced from a dispersion of a non-aqueous liquid phase and dispersed dicarboxylic acid salts.

Reference in this regard is specifically made to the nucleation agents described in WO 2011/047797 A1.

In addition to the β-nucleating agents, it is important to maintain a specific temperature range and dwell time at these temperatures when cooling the molten film in order to obtain a high proportion of β-crystalline polypropylene. The molten film is advantageously cooled at a temperature of 60° C. to 140° C., in particular 80° C. to 130° C. Slow cooling promotes growth of the β-crystallites. In this regard, the take-off speed, i.e. the speed at which the molten film runs over the first cooling roller, should be slow and/or the take-off roller should have an appropriately large circumference. In this manner, the necessary dwell time can be controlled and the film can be cooled sufficiently slowly at the selected temperature. The take-off speed is preferably less than 25 m/min, in particular 1 to 20 m/min. The dwell times for the molten film on the take-off roller at the appropriate temperature should be longer than 15 s, preferably longer than 40 s, and in particular longer than 60 s. In practice, in general, a dwell time of 10 min is not exceeded, even though for technical reasons there is no limit as regards a maximum dwell time.

Particularly preferred embodiments of the porous film in accordance with the invention contain 50 to 10000 ppm, preferably 50 to 5000 ppm, in particular 50 to 2000 ppm of calcium pimelate or calcium suberate as the β-nucleating agent in the porous layer.

The porous layer generally contains 60% to <100% by weight, preferably 65% to 95% by weight, of propylene homopolymers and/or propylene block copolymer and 0.001% to 5% by weight, preferably 50-10000 ppm of at least one β-nucleating agent with respect to the weight of the porous layer. In the case in which further polyolefins, for example the "other polyolefins" described above, are contained in the layer, the proportion of propylene homopolymers or block copolymers is reduced appropriately.

In general, then, the quantity of the additional other polymers in the layer is 0 to <40% by weight, preferably >0 to 35% by weight, in particular 0.5% to 20% by weight, if they are additionally contained therein. In similar manner, the proportion of said propylene homopolymer or propylene block copolymer is reduced if large quantities of up to 5% by weight of β-nucleating agent are used. In addition, the layer may contain the usual stabilizers and neutralizing agents, as well as optional further additives in the usual small quantities of less than 2% by weight.

In a preferred embodiment, the porous layer is constructed from a mixture of propylene homopolymer and propylene block copolymer. The porous layer in this embodiment generally contains 50% to 85% by weight, preferably 60% to 75% by weight of propylene homopolymers and 15% to 50% by weight of propylene block copolymers, preferably 25% to 40% by weight, and 0.001% to 5% by weight, preferably 50-10000 ppm of at least one β-nucleating agent, with respect to the weight of the layer, as well as, if necessary, the additives already mentioned above such as stabilizers and neutralizing agents. In this case, optional further polyolefins may be present in a quantity of 0 to <20% by weight, preferably >0 to 5% by weight, in particular 0.05% to 1% by weight. In these embodiments as well, the proportion of the propylene homopolymers or the block copolymers are appropriately reduced when the respective quantities of δ-nucleating agent, additives or other polymers are added.

The porous film may be single or multi-layered. The thickness of the porous film is generally in the range 10 to 150 µm, preferably in the range 15 to 100 µm. The porous film may be provided with a corona, flame or plasma treatment in order to improve filling or coating with the ion-conducting polymers.

In a single-layered embodiment, the film comprises only the porous layer described above. In a multi-layered embodiment, the film comprises at least one or more further porous layer(s) which is (are) constructed in the manner of the porous layer described above, wherein the composition of the various porous layers do not necessarily have to be identical and may vary within the context of the composition described above.

The thickness of the porous film is generally in the range from at least 0.35 to 0.6 g/cm$^3$, preferably in the range 0.35 to 0.55 g/cm$^3$. For the application in accordance with the invention, the film should have a Gurley value of 10 to <1000 s, preferably 50 to 500 s. The bubble point for the film should not be above 350 nm, preferably 20 to 300 nm, and the mean pore diameter should be in the range 30 to 100 nm, preferably in the range 40 to 80 nm.

Preferably, the film has a longitudinal contraction of 10%, preferably 5% in the longitudinal direction at 100° C. for 1 hour and in the transverse direction, a contraction of ≤10%, preferably ≤5%, in particular >0 to <2% at 100° C. and for 1 hour.

The porous film is manufactured in accordance with known flat film extrusion processes or co-extrusion processes. In the context of this method, the propylene homopolymer and/or propylene block copolymer and β-nucleating agent and any further additives for the respective layer(s) are mixed, melted in an extruder, if appropriate together and simultaneously, and extruded or co-extruded through a flat die. In this manner, the single- or multi-layered molten film solidifies, forming the β-crystallites during cooling. The cooling temperatures and cooling periods are selected in a manner such that the proportion of β-crystalline polypropylene in the pre-film is as high as possible. In general, the proportion of β-crystallites in the pre-film is 30-80%, preferably 40-70% (DSC, 1$^{st}$ heating curve). This pre-film with a high proportion of β-crystalline polypropylene is then stretched biaxially in a manner such that the stretching causes a transformation of the β-crystallites into a polypropylene, with the formation of a network-like porous structure. The biaxially stretched film is then generally heat-fixed and corona, plasma or flame treated if appropriate.

The biaxial stretching (orientation) is generally carried out in succession, wherein preferably, it is firstly stretched in the longitudinal direction (in the machine direction) and then stretched in the transverse direction (perpendicular to the machine direction).

The take-off roller or the take-off rollers are maintained at a temperature of 60° C. to 135° C., preferably 100° C. to 130° C., in order to promote the formation of a high proportion of β-crystalline polypropylene in the layer(s). The dwell time at these temperatures is generally at least 10 sec, preferably 40 s, wherein the period should in particular be in the range 60 s to 5 min.

When stretching in the longitudinal direction, the temperature ($T_L$) is less than 140° C., preferably 70° C. to 120° C. The longitudinal stretching ratio is in the range 2:1 to 5:1, preferably in the range 3:1 to 4.5:1. Stretching in the transverse direction is carried out at a temperature ($T_Q$) of 120° C. to 150° C. The stretching ratio is in the range 2:1 to 9:1, preferably 3:1 to 8:1.

Longitudinal stretching is advantageously carried out with the aid of two or more rollers running at different speeds appropriate to the desired stretching ratio and transverse stretching is carried out with the aid of an appropriate tenter frame.

In this regard, after longitudinal stretching, if necessary the film is cooled once again over appropriately temperature-controlled rollers. Next, in what are known as the heating zones, heating is carried out once more to the transverse stretching temperature ($T_Q$) which is in general a temperature of 120° C.-150° C. Next, transverse stretching is carried out with the aid of an appropriate tenter frame, wherein the transverse stretching ratio is in the range 2:1 to 9:1, preferably 3:1 to 8:1. In order to obtain particularly high porosities, the transverse stretching may be carried out with a moderate to slow transverse stretching speed of >0 to 40%/s, preferably 0.5% to 30%/s, in particular 1% to 15%/s.

If appropriate, and as mentioned above, after biaxial stretching a surface of the film may be treated using the known methods of corona, plasma or flame treatment.

Biaxial stretching of the film is followed by a heat treatment (thermofixing) if appropriate. In general, this thermofixing is carried out for a period of ≥20 s, preferably ≥25 s and at a temperature in the range 100° C. to 150° C., preferably 120° C. to 160° C. This thermal post-treatment may, for example, be carried out over rollers or a hot air box or alternatively in a separate step of the method. Details regarding the special conditions during thermofixing in order to obtain a particularly high resistance to perforation are described in German patent application 10 2013 001 700.9; reference thereto is specifically made herein.

If appropriate, immediately prior to or during thermofixing, the film is run convergently, with the convergence preferably being 5% to 25%, in particular 8% to 20%, particularly preferably 10% to 15%. The term "convergence" should be understood to mean a slight running together of the transverse stretching frame so that the maximum width of the frame which is given at the end of the transverse process is larger than the width at the end of thermofixing. Clearly, the same is true for the width of the film web. The degree of convergence of the transverse stretching frame is termed the convergence, which is calculated from the maximum width of the transverse frame $B_{max}$ and the final film width $B_{film}$ using the following formula:

convergence [%]=100×($B_{max}$−$B_{film}$)/$B_{max}$

The β-porous films described above are used in accordance with the invention for the manufacture of ion exchange membranes. In this regard, the β-porous films are coated or partially or completely filled with ion-conducting polymers, in particular proton-conducting polymers. Proton/ion-conductive polymers are also termed ionomers. Examples of suitable ion-conducting polymers for the manufacture of the ion exchange membranes from the β-porous films are acid-modified polymers such as known tetrafluoroethylene-fluorovinylether copolymers with acid functions, in particular sulphonic acid groups which, for example, are marketed under the trade name Nafion® by E. I. du Pont, as well as other, in particular fluorine-free ionomers such as sulphonated polyetherketones or arylketones or polybenzimidazoles.

Preferably, fluoropolymer electrolytes are used as the ion-conducting polymers for the manufacture of the ion exchange membranes of the invention. Examples of suitable fluoropolymer electrolytes for coating the β-porous films are perfluorosulphonic acid polymers with C—F bonds and sulphonic acid groups, preferably copolymers, which are constructed from repeating units with general formula (1) and repeating units with general formula (2), wherein the formulae (1) and (2) are as follows:

$$—(CF_2CF_2)— \quad (1)$$

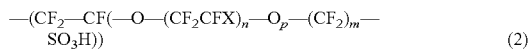

$$—(CF_2—CF(—O—(CF_2CFX)_n—O_p—(CF_2)_m—SO_3H)) \quad (2)$$

wherein, in formula (2):

X represents a fluorine atom or a $CF_3$ group;

n represents a whole number from 0 to 5, m represents a whole number from 0 to 12, and p represents 0 or 1, with the condition that a combination of n=0 and m=0 is excluded.

As an example, the fluoropolymer electrolytes are manufactured from a pre-polymer by alkaline hydrolysis or acid decomposition. As an example, by means of polymerization, a pre-polymer may be produced with repeating units with general formula (3) and the pre-polymer then undergoes an alkaline hydrolysis, an acid treatment or similar treatments, wherein formula (3) is as follows:

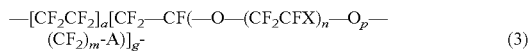

$$—[CF_2CF_2]_a[CF_2—CF(—O—(CF_2CFX)_n—O_p—(CF_2)_m\text{-A})]_g— \quad (3)$$

wherein, in formula (3):

X represents a fluorine atom or a $CF_3$ group;

n represents a whole number from 0 to 5, m represents a whole number from 0 to 12, and p represents 0 or 1, with the condition that a combination of n=0 and m=0 is excluded;

and

A represents $COOR_1$, $COR_2$ or $SO_2R_2$, wherein $R_1$ represents an alkyl group containing 1 to 3 carbon atoms and $R_2$ represents a halogen atom.

The pre-polymer of formula (3) is obtained, for example, by copolymerization of a fluorinated olefinic compound with a fluorinated vinyl compound.

Examples of fluorinated olefinic compounds include tetrafluoroethylene, hexafluoropropylene, trifluoroethylene, monochlorotrifluoroethylene, perfluorobutylethylene ($C_4F_9CH=CH_2$), perfluorohexaethylene ($C_6F_{13}CH=CH_2$) and perfluorooctaethylene ($C_6F_{17}CH=CH_2$). These units may be used alone or in combinations of two or more of these units.

Examples of fluorinated vinyl compounds are the following compounds with the formula (4) given below:

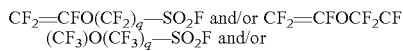

$$CF_2=CFO(CF_2)_q—SO_2F \text{ and/or } CF_2=CFOCF_2CF(CF_3)O(CF_3)_q—SO_2F \text{ and/or}$$

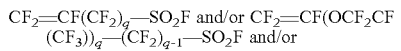

$$CF_2=CF(CF_2)_q—SO_2F \text{ and/or } CF_2=CF(OCF_2CF(CF_3))_q—(CF_2)_{q-1}—SO_2F \text{ and/or}$$

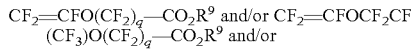

$$CF_2=CFO(CF_2)_q—CO_2R^9 \text{ and/or } CF_2=CFOCF_2CF(CF_3)O(CF_2)_q—CO_2R^9 \text{ and/or}$$

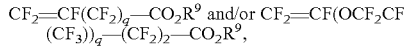

$$CF_2=CF(CF_2)_q—CO_2R^9 \text{ and/or } CF_2=CF(OCF_2CF(CF_3))_q—(CF_2)_2—CO_2R^9,$$

wherein q is a whole number from 1 to 8 and $R^9$ is an alkyl group containing 1 to 3 carbon atoms.

The pre-polymer with formula (3) is manufactured from the units mentioned above by means of known copolymerization methods.

This pre-polymer then undergoes a hydrolysis in a basic liquid which is capable of reacting and is then washed with warm water, and then undergoes an acid treatment. The acid treatment protonates the pre-polymer and a perfluorocarbon compound is obtained, for example a protonated perfluorocarbosulphonic acid.

The ion-conducting polymer preferably has a content of 100% by weight, with respect to the total weight of the polymer which from the standpoint of chemical stability is used as a fluoropolymer electrolyte, but which may contain a hydrocarbon polymer electrolyte in any proportions. Examples of hydrocarbon polymer electrolytes are polyphenylenesulphide, polyphenyleneether, polysulphone, polyethersulphone, polyetherethersulphone, polyetherketone, polyetherketone, polythioetherethersulphone, polythioetherketone, polythioetherketone, polybenzimidazole, polybenzoxazole, polyoxadiazole, polybenzoxazinone, polyxylylene, polyphenylene, polythiophene, polypyrrole, polyaniline, polyacene, polycyanogen, polynaphthylidine, polyphenylensulphidesulphone, polyphenylenesulphone, polyimide, polyetherimide, polyesterimide, polyamideimide, polyarylate, aromatic polyamide, polystyrene, polyester and polycarbonate. The hydrocarbon polymer electrolyte preferably makes up 50% by weight or less with respect to the total weight of the polymer electrolyte, in particular 20% by weight or less, and more preferably 10% by weight or less.

Suitable fluoropolymer electrolytes for coating or filling in accordance with the invention of the β-porous film preferably have an ion exchange capacity of 1.0 to 3.3 meq/g. The ion exchange capacity of less than 3.3 meq/g favours less swelling of the ion exchange membrane when operating the fuel cell, even at high temperatures and increased humidity. Less swelling of the ion exchange membrane is advantageous to the durability and improves the adhesion to the electrodes and/or layers of catalyst. On the other hand, an ion exchange capacity of 1.0 meq/g or more provides a high performance even at high temperatures and a lower humidity. Thus, an ion exchange capacity, in particular of the fluoropolymer electrolytes, of 1.2 to 3.0 meq/g, in particular 1.5 to 2.9 meq/g, and more preferably 1.7 to 2.5 meq/g, is preferred.

The ion exchange capacity of the ion exchange membrane or the polymer electrolyte is determined as described below. Initially, the ion exchange membrane or the polymer electrolyte is transferred into the protonated form. To this end, the membrane or the electrolyte is placed in a 1 molar HCl solution at ambient temperature (25° C.) for 24 h. Next, it is washed with distilled water, for example by soaking or rinsing.

The ion exchange membrane protonated in this manner or the polymer electrolyte is then immersed in a saturated aqueous NaCl solution and stirred at 25° C. Next, it is titrated against an aqueous solution of 0.01 N NaOH to neutrality. After neutralization, the ion exchange membrane or the polymer electrolyte is separated out, for example by filtering. The polymer electrolyte or the ion exchange membrane is then in a condition in which the counter ion of the exchange group is a sodium ion. The polymer electrolyte or the ion exchange membrane is then rinsed with pure water, dried under vacuum and weighed. If the quantity of sodium hydroxide which is used for neutralization is expressed as M (mmol/L) and the weight of the ion exchange membrane or the polymer electrolyte which has a sodium ion as the counter ion for the exchange group is expressed as W (mg), the equivalent weight EW (g/equivalent) can be determined using the following equation:

$$EW=(W/M)-22$$

Next, the ion exchange capacity (meq/g) is calculated by forming the reciprocal of the EW value and this reciprocal is multiplied by 1000.

By specifically adjusting the number of ion exchange groups which are present in 1 g of fluoropolymer electrolytes, the ion exchange capacity is adjusted in a manner such that it falls within the range cited above.

Preferably, the fluoropolymer electrolyte has a water content of 30% by weight to 330% by weight at 80° C., in particular 70% by weight to 280% by weight, more preferably 120% by weight to 255% by weight and particularly preferably 160% by weight to 220% by weight. Adjusting the water content in the fluoropolymer electrolyte to fall within the above range means that a better dimensional stability for the ion exchange membrane as well as a higher cell power at higher temperatures and lower humidity can be obtained. The water content of 30% by weight or more at 80° C. may contribute to fuel cells which are manufactured from the ion exchange membrane of the invention developing a high cell output, since a sufficient quantity of water is available for proton transfer.

The water content of the fluoropolymer electrolyte at 80° C. may be adjusted to the range described above by specifically adjusting the molecular weight, the MFI, the crystallinity and the ion exchange capacity of the polymer electrolyte as well as the hydrophilically treated surface of the described β-porous film, the temperature and duration of the heat treatment for the ion exchange membrane. Examples of measures for increasing the water content at 80° C. include increasing the ion exchange capacity in polymer electrolytes, increasing the MFI of the pre-polymer for the polymer electrolytes, reducing the temperature and/or duration of the heat treatment in order to limit the crystallization of the polymer electrolytes, and hydrophilic modification of the surface of the n-porous film described above, for example by means of a corona, flame or plasma surface treatment. On the other hand, examples of measures for reducing the water content at 80° C. include reducing the ion exchange capacity of the polymer electrolytes and reducing the MFI of the pre-polymer for the polymer electrolytes, or similar measures.

As an alternative to the fluoropolymer electrolytes such as Nafion®, sulphonated polyetherketones, which are known per se, may also be used as ion-conducting polymers for coating or filling the 6-porous film. These polymers are often used for the manufacture of ion exchange membranes from ionomers alone. Examples of suitable sulphonated polyetherketones have been described in WO-A 96/29359 and WO-A-96/29360.

The term "aromatic polyetherketones" as used in the context of this invention should be understood to mean all polymers which comprise the structural units —Ar—O— and —Ar—CO—, wherein Ar represents an aromatic residue. These structural units may be bonded together in various manners, in particular in the p-position. In common parlance, the first unit is described as "E" (ether) and the second unit as "K" (ketone). Depending on the sequence of the ether and ketone units, a distinction can be made, for example, between PEK, PEEK, PEKK or PEEKK types. All of these types of polymers are termed polyetherketones within the meaning of the invention. In the sulphonated aromatic polyetherketones used in accordance with the invention, any polymers may be used, for example PEEK, PEKK, PEEKK or in particular PEK, provided that they exhibit the desired ion exchange capacity.

Compositions which are particularly preferred are those in which the sulphonated polyetherketone contains the repeat unit with the following formula (I):

—[Ar—O—Ar—CO]— (I), wherein Ar is a divalent aromatic residue, optionally substituted with one or more monovalent organic groups which are inert under the conditions of use, and wherein at least a portion of the residues Ar is substituted with residues with formula —SO$_3$H.

Compositions which are particularly preferred are those wherein the sulphonated polyetherketone has an ion exchange capacity of 1.6 to 2.9 meq (—SO$_3$H)/g polymer.

In more detail, these sulphonated polyetherketones are described in paragraphs 16 to 55 of EP 1 144 100 A1; reference thereto is specifically made herein.

As an example, sulphonated, strictly alternating polyetherketones (A) with repeat units with formula (I) are also suitable:
—Ar—O—Ar—CO—, wherein Ar and Ar', independently of each other, are divalent aromatic residues,
Ar is preferably a phenylene residue with para- and/or meta-bonds and Ar' is preferably a phenylene or naphthylene residue.

These polymers are described in EP 1 124 625 B1; again, reference thereto is specifically made herein.

The ion exchange membrane of the present invention comprises a β-porous film which is coated and/or filled with the ion-conducting polymers described herein.

Solutions or dispersions of the ion-conducting polymers are produced from said ion-conducting polymers and suitable solvents. The solvent must be a good solvent for the ion-conducting polymers. The ion-conducting polymer is dissolved in a concentration of 1% to 30% by weight with respect to the total weight of the solution in the solvent. The selection of the solvent depends on the ion-conducting polymers which have to be used for coating or filling. The following information regarding possible solvents are for the case in which the ion-conducting polymers are acid-modified fluoropolymers such as tetrafluoroethylene-fluorovinylether copolymers with acid groups, in particular sulphonic acid groups, for example Nafion®. Examples of suitable solvents are mono- and poly-alcohols, glycols as well as glycolether alcohols and glycol ether, heterocyclic, aliphatic or aromatic solvents, for example with an evaporation number (EN) of more than 600, preferably more than 800. The evaporation number is determined in accordance with DIN 53170. It is a relative value. The reference is diethylether. A evaporation number of more than 600 means that the solvent is suitable for screen printing processes. Examples of suitable solvents are propyleneglycol, dipropyleneglycol, glycerine and hexyleneglycol, as well as others. Dispersions or solvents of the ion-conducting polymers are also offered for commercial sale.

The ionomer dispersions or solutions described above are applied to the β-porous films. This coating is carried out using known processes, for example using a doctor blade or spraying or printing.

To this end, the dispersions or solutions of the ion-conducting polymers are applied directly to the surface of the β-porous film described above, wherein in general, it is not necessary to pre-treat the film with bonding agents or to use bonding agents in the dispersion. Furthermore, it has been shown that, particularly with β-porous films, it is not necessary to pre-treat the surface of the film, in particular the side of the film which is subsequently to be coated, using the known corona, plasma or flame treatment, and the ion-conducting polymers can be applied directly from the solution or the dispersion to the porous film.

The quantity of dispersion which is applied is preferably in the range 1 g/m² to 80 g/m². Next, the freshly coated β-porous film is dried using a commercial dryer. Drying is usually carried out at temperatures between 50° C. and 140° C. The drying times in this regard are between 30 seconds and 60 minutes.

Alternatively, the β-porous film may be immersed in the dispersion in order to substantially fill the pores of the film with the ion-conducting polymers. To this end, the film is placed in the dispersion for a total of 30 seconds to 600 minutes, for example, then removed from the dispersion and then undergoes the usual drying procedure.

After coating or filling with the ion-conducting polymers, the thickness of the ion exchange membrane in accordance with the invention is preferably 10 μm to 500 μm, in particular 15 μm to 100 μm, more preferably 20 μm to 50 μm. The ion exchange membrane in accordance with the invention effectively prevents direct reaction between hydrogen and oxygen even when a pressure difference occurs or another type of stress occurs during the manufacture of fuel cells or during operation of the fuel cell.

The uncoated β-porous film is a white opaque film with a very low transparency, in general at most 15%, preferably 3% to 13%. This optical property arises because of the refraction and diffusion of light at the polymer-air interfaces. After filling the pores with the ion-conducting polymers (after drying), these interfaces are reduced and the transparency is substantially increased. The increased transparency is thus an indication of the at least partial filling of the pores by the ion-conducting polymer.

The ion exchange membrane in accordance with the invention is thus characterized by a transparency which is increased compared with the β-porous film and is generally at least 20%, preferably 25% to 50%.

Surprisingly, the ion exchange membrane is characterized by an excellent gas tightness to hydrogen, oxygen and methanol. The Gurley value for the ion exchange membrane (after coating and drying before swelling) is at least 10000 s, preferably at least 15000 s, in particular at least 30000 s. Since the Gurley value is infinite in the ideal case, these Gurley values are given as open-ended ranges.

In order to characterize the raw materials and the films, the following measurement methods were used:

Melt Flow Index:

The melt flow index of the propylene polymers was measured in accordance with DIN 53 735 under 2.16 kg load and at 230° C.

Melting Point:

In the context of the present invention, the melting point is the maximum of the DSC curve. In order to determine the melting point, a DSC curve is recorded at a heating and cooling rate of 10K/1 min in the range 20° C. to 200° C. In order to determine the melting point, as is usual, the second heating curve after cooling at 10K/1 min in the range 200° C. to 20° C. was evaluated.

β proportion and β-activity

The proportion or content of β-crystalline polypropylene in the unstretched pre-film or an alternative specimen was determined using DSC. This characterization is carried out as described in J. o. Appl. Polymer Science, Vol. 74, p.: 2357-2368, 1999, Varga, as follows: the sample or pre-film supplemented with the β-nucleating agent is initially heated at a heating rate of 10° C./min to 220° C. in the DSC and melted ($1^{st}$ heating). Then it is cooled at a cooling rate of 10° C./min to 50° C. before being heated up and melted a second time at a heating rate of 10° C./min ($2^{nd}$ heating).

β-Proportion

The proportion of β-crystalline polypropylene $K_{\beta,DSC}$ present in the measured sample or pre-film is determined using the DSC curve for the $1^{st}$ heating, from the ratio of the melting enthalpies for the β-crystalline phase ($H_\beta$) to the sum of the melting enthalpies of the β and α crystalline phases ($H_\beta + H_\alpha$). The percentage is calculated as follows:

$$K_{\beta,DSC}[\%] = 100 \times (H_\beta)/(H_\beta + H_\alpha)$$

β-Activity:

A second $K_{\beta-max}$ value (maximum degree of crystallinity) is determined, which provides the maximum β proportion which can be obtained with the respective sample, using the DSC curve for the $2^{nd}$ heating, from the ratio of the melting enthalpies for the β-crystalline phase ($H_\beta$) to the sum of the melting enthalpies of the β and α crystalline phases ($H_\beta + H_\alpha$). This maximum β-activity $K_{\beta-max}$ also characterizes the effectiveness of the respective β-nucleating agent employed.

The β-proportion of the pre-film is also determined by means of a DSC measurement which is carried out on the pre-film in the following manner: the pre-film is initially heated in the DSC at a heating rate of 10K/min to 220° C. and melted, and then cooled at a cooling rate of 10K/min. The degree of crystallinity $K_{\beta,DSC}$ is determined from the 1st heating curve as the ratio of the melting enthalpies of the β-crystalline phase ($H_\beta$) to the sum of the melting enthalpies of the β and a crystalline phases ($H_\beta + H_\alpha$).

$$\beta - \text{content}[\%] = -\frac{H\beta}{H\alpha + H\beta} * 100$$

Thickness:

The thickness of the β-porous film, the coated film and also the swollen film is measured using the "ProGage Thickness Tester" measurement device from Twing Albert.

Density:

The density (δSep) is determined in accordance with DIN 53 479, method A.

Weight Per Unit Area:

A 10*10 cm² sample is cut out of the β-porous film or ion exchange membrane and weighed. The result of weighing is multiplied by 100 and thus provides the weight of a film sample the size of one m² and corresponds to the weight per unit area in g/m².

Porosity:

The porosity is calculated as the % free volume in the separator film accessible to the electrolytes, as follows:

$$\text{Porosity}[\%] = -\frac{\delta Sep - 0.925}{0.925} * 100[\%]$$

In this manner, a density for the polypropylene of 0.925 g/cm³ was determined.

Permeability (Gurley Value)

The permeability of the films or the ion exchange membranes is measured using a Gurley Tester 4110, in accordance with ASTM D 726-58. In this regard, the time (in sec) is determined for 100 cm³ of air to permeate through the sample surface of 1 inch² (6.452 cm²). The pressure difference over the film or the ion exchange membrane corresponds in this regard to the pressure of a column of water 12.4 cm high. The time required then corresponds to the Gurley value. For a 100% gas-tight membrane, the Gurley value is infinite.

Dimensional Change:

The extensions in length of the ion exchange membrane prior to the swelling process are denoted $L_0$ in the longitudinal direction and $Q_0$ in the transverse direction. The longitudinal direction is the machine direction, and the transverse direction corresponds to the direction transverse to the machine direction. A 10*10 cm² sample is cut out of the ion exchange membrane and measured precisely. Next, in order to investigate its swelling behaviour, the ion exchange membrane is placed in distilled water at ambient temperature for one hour in a manner such that the ion exchange membrane is completely covered with water. Next, the ion exchange membrane is removed from the water and surplus water is wiped off.

Next, the extensions in length of the sample longitudinally and transversely are determined once again ($L_1$ and $Q_1$). The difference in the determined extensions in length as a ratio of the original lengths $L_0$ and $Q_0$ multiplied by 100 then gives the dimensional change.

$$Dimensional change\ longitudina[\%] = \frac{L_0 - L_1}{L_0} * 100[\%]$$

$$Dimensional change\ transverse[\%] = \frac{Q_0 - Q_1}{Q_0} * 100[\%]$$

Transparency:

The transparency is measured using the Haze TC from Pausch Messtechnik, Deutschland, or Hazegard-plus from Byk-Gardner, USA, in accordance with the ASTM method D 1003-61.

The invention will now be illustrated with reference to the following examples.

EXAMPLES

Manufacture of β-Porous Film

Film Example 1

Calcium pimelate as the β-nucleating agent was mixed in a mixer in a concentration of 0.04% by weight with granulated isotactic polypropylene homopolymer (melting point 162° C.; MFI 3 g/10 min) and a propylene block copolymer and melted in a twin screw extruder (housing temperature 240° C.). After the extrusion process, the melt was extruded through a wide slit die at an extrusion temperature of 245° C. to form a single layered film. This film had the following composition:

Approximately 80% by weight of propylene homopolymer (PP) with a n-heptane-soluble fraction of 4.5% by weight (with respect to 100% PP) and a melting point of 165° C.; and a melt flow index of 3.2 g/10 min at 230° C. and 2.16 kg load (DIN 53 735), and Approximately 20% by weight of propylene-ethylene block copolymer with an ethylene fraction of approximately 5% by weight with respect to the block copolymer; and a melt flow index (230° C. and 2.16 kg) of 6 g/10 min 0.04% by weight of Ca pimelate as the β-nucleating agent.

The film additionally contained stabilizer and neutralizing agents in the usual quantities.

After extrusion, the polymer mixture was drawn off over a first take-off roller and a further roller trio, cooled and solidified, then stretched longitudinally, stretched transversely and fixed; the details of the conditions were as follows:

| | |
|---|---|
| extrusion temperature: | 245° C. |
| cooling roller: | temperature 125° C. |
| take-off speed: | 1.5 m/min (dwell time on take-off roller: 55 sec) |
| longitudinal stretching: | stretching roller T = 90° C. |
| longitudinal stretching by- | factor of 4 |
| transverse stretching: | heating zone T = 145° C. |
| draw zones: | T = 145° C. |
| transverse stretching by- | factor of 4 |

The β-porous film produced in this manner was approximately 25 μm thick and had a density of 0.30 g/cm³, and had a uniform white opaque appearance, i.e. a very low transparency (approximately 15%). The porosity was 66% and the Gurley value was 200 s; the weight per unit area was 8 g/m².

Nafion Solution:

As the Nation solution, a product from Ion Power (LIQUION™, LQ-1115-1100 EW) was used with the following composition: 15% by weight of Nation, ethanol: 40% by weight and 45% by weight of water. The ion exchange capacity of the Nafion was 1 meq/g.

Nafion Coatings

Example 1

The Nafion solution was applied manually to the β-porous film in accordance with film example 1 (sample sizes corresponding to DIN A4 sample) using a wire rod (wire diameter: 0.4 mm), applying several times (three). The Nafion solution wetted the film uniformly. The coated film was then dried in a drying cabinet for one hour at 90° C. Next, the weight per unit area, the transparency, the thickness and the Gurley value were measured for the coated film, i.e. the ion exchange membrane.

The transparency of the white opaque β-porous film had substantially increased after coating with the Nafion solution (after drying). This is an indication of at least partial filling of the pores by the ion-conducting polymer. This reduces the interfaces between the polymer matrix and air and the transparency is increased. The increased transparency is thus a measure of successful filling of the pores with the ion-conducting polymer.

Next, in order to investigate the swelling behaviour, the ion exchange membrane was placed in distilled water for one hour at ambient temperature in a manner such that the film was completely covered with water. Next, the film was removed from the water and surplus water was wiped off. Next, the weight per unit area, the transparency, the thickness (or change in thickness compared with film prior to swelling), dimensional changes in the longitudinal and transverse directions (compared with the film prior to swelling) were measured.

Example 2

The Nafion solution was applied using a doctor blade as described in Example 1, but in contrast to Example 1, the Nafion solution was initially applied to one surface and then to the opposite surface of the β-porous film (once each time with a wire rod, wire diameter: 0.4 mm). Finally, the procedure as described in the above example was carried out and the membrane was placed in water under identical conditions. Finally, the measurements described above were taken (see table).

Examples 3 to 6

A β-porous film in accordance with film example 1 was placed in the Nafion solution as described above for 0.5, 3, 5 and 8 hours respectively. Next, the film was removed from the solution and dried for one hour at 90° C. in a drying cabinet. Next, the weight per unit area, transparency, thickness and Gurley value for the coated film, i.e. the membrane, were measured.

Next, in order to investigate the swelling behaviour, the membrane was placed in distilled water for one hour at ambient temperature in a manner such that the membrane was completely covered with water. Next, the film was removed from the water and surplus water was wiped off. Next, the weight per unit area, the transparency, the thickness (or change in thickness compared with the membrane prior to swelling), and dimensional changes in the longitudinal and transverse directions (compared with the membrane prior to swelling) were measured.

Contrasting Example 1

A Nafion solution was applied in a single layer to the porous film in accordance with film example 1 (sample sizes corresponded to a DIN A4 sample) using a wire rod (wire diameter: 0.4 mm). The Nafion solution wetted the film uniformly. The coated film was then dried in a drying cabinet for one hour at 90° C. Next, the weight per unit area, the transparency, the thickness and the Gurley value of the coated film were measured.

Next, in order to investigate the swelling behaviour, the ion exchange membrane was placed in distilled water for one hour at ambient temperature in a manner such that the film was completely covered with water. Next, the film was removed from the water and surplus water was wiped off. Next, the weight per unit area, the transparency, the thickness (or change in thickness compared with film prior to swelling), the dimensional changes in the longitudinal and transverse directions (compared with the film prior to swelling) were measured.

Contrasting Example 2 (Non-Reinforced Film of Pure Ionomer)

A Nafion film (type N-115) was dried for 24 h in vacuum in a desiccator. Next, the weight per unit area, the transparency, the thickness and the film were measured.

Next, in order to investigate the swelling behaviour, the ion exchange membrane was placed in distilled water for one hour at ambient temperature in a manner such that the film was completely covered with water. Next, the film was removed from the water and surplus water was wiped off. Next, the weight per unit area, the transparency, the thickness (or change in thickness compared with film prior to swelling), the dimensional changes in the longitudinal and transverse directions (compared with the film prior to swelling) were measured.

|  | Dip time | Gurley of uncoated film | Gurley after coating | Wt per unit area after coating in g/m² | Wt per unit area after swelling, g/m² | Transparency after coating | Transparency after swelling |
|---|---|---|---|---|---|---|---|
| Example 1 | Application 3x with rod | 200 | >30000 | 17.8 | 32 | 33.5 | 54.5 |
| Example 2 | Application with rod front and back | 200 | >30000 | 18.2 | 38 | 33.5 | 58.5 |
| Example 3 | 30 min immersion in solution | 200 | >30000 | 22.88 | 41 | 32.5 | 61.9 |
| Example 4 | 1 hour immersion | 200 | >30000 | 25.4 | 53 | 32 | 64.8 |
| Example 5 | 5 hours immersion | 200 | >30000 | 32.3 | 66 | 34.2 | 68.6 |
| Example 6 | 8 hours immersion | 200 | >30000 | 38.2 | 89 | 36.7 | 72.5 |
| Contrasting example 1 | Application once with rod | 200 | 2189 | 12.4 | 17.3 | 25.6 | 27.8 |
| Contrasting example 2 | Nafion film 115 | >30000 |  | 239 * | 298 | 82** | 84 |

* Surface wt Nafion film 115
**Transparency Nafion film 115

|  |  | Thickness after coating | Thickness after swelling | Change in thickness % | Dimensional change, longitudinal/% | Dimensional change, transverse/% |
|---|---|---|---|---|---|---|
| Example 1 | Application 3x with rod | 30.7 | 48.3 | 57.3 | −0.9 | −0.4 |
| Example 2 | Application with rod front and back | 32.4 | 47 | 45.1 | −4.2 | 1.7 |
| Example 3 | 30 min immersion in solution | 32 | 48 | 50.0 | 2.5 | 3.0 |
| Example 4 | 1 hour immersion | 31.6 | 50 | 58.2 | −0.5 | 0.6 |

| | | Thickness after coating | Thickness after swelling | Change in thickness % | Dimensional change, longitudinal/% | Dimensional change, transverse/% |
|---|---|---|---|---|---|---|
| Example 5 | 5 hours immersion | 32.3 | 56 | 73.4 | −2.0 | 0.5 |
| Example 6 | 8 hours immersion | 34 | 72 | 111.8 | −3.7 | 1.2 |
| Contrasting example 1 | Application once with rod | 28 | 34 | 21.4 | −3.7 | 1.2 |
| Contrasting example 2 | Nafion film 115 | 122 | 148 | 21.3 | 8.0 | 9.2 |

The invention claimed is:

1. An ion exchange membrane containing a biaxially orientated single or multi-layered β-porous polypropylene film which contains at least one β-nucleating agent and comprises an ion-conducting polymer and exhibits a Gurley value of at least 30,000 s.

2. The ion exchange membrane as claimed in claim 1, wherein the porosity of the n-porous film is produced by transforming β-crystalline polypropylene during stretching of the film.

3. The ion exchange membrane as claimed in claim 1, wherein the β-porous film contains at least 50% by weight with respect to the weight of the film of propylene polymer or propylene polymers and the propylene polymer is a propylene homopolymer and/or a propylene block copolymer.

4. The ion exchange membrane as claimed in claim 1, wherein the β-porous film contains 50% to 85% by weight of propylene homopolymer, 15% to 50% by weight of propylene block copolymer and 50 to 10000 ppm of β-nucleating agent.

5. The ion exchange membrane as claimed in claim 1, wherein the density of the β-porous film is in the range 0.35 to 0.55 g/cm$^3$ and the Gurley value is 10 to <1000 s.

6. The ion exchange membrane as claimed in claim 1, wherein the ion exchange membrane has a transparency of at least 20%.

7. The ion exchange membrane as claimed in claim 1, wherein the ion exchange membrane has a transparency of 25% to 50%.

8. The ion exchange membrane as claimed in claim 1, wherein the ion-conducting polymers are fluoropolymer electrolytes, sulphonated polyetherketones, aryl ketones or polybenzimidazoles.

9. The ion exchange membrane as claimed in claim 1, wherein the ion-conducting polymers, are fluoropolymer electrolytes and exhibit an ion exchange capacity of 1.0 to 3.3 meq/g.

10. The ion exchange membrane as claimed in claim 1, wherein the ion-conducting polymers are proton-conducting polymers.

11. A fuel cell which comprises the ion exchange membrane as claimed in claim 1.

12. An ion exchange membrane containing a biaxially oriented single or multi-layered β-porous polypropylene film which contains at least on β-nucleating agent and comprises an ion-conducting polymer and exhibits a Gurley value of at least 10,000 s,
wherein the porous polypropylene film comprises 50 to 10000 ppm of calcium pimelate or calcium suberate as the β-nucleating agent in the porous layer.

13. An ion exchange membrane containing a biaxially orientated single or multi-layered β-porous polypropylene film which contains at least one β-nucleating agent and comprises an ion-conducting polymer and exhibits a Gurley value of at least 10,000 s, and wherein the β-porous film contains 60% to 75% by weight of propylene homopolymer, 25% to 40% by weight of propylene block copolymer and 50 to 10000 ppm of β-nucleating agent and wherein the film comprises 50 to 2000 ppm of calcium pimelate or calcium suberate as the β-nucleating agent in the porous layer.

* * * * *